(12) United States Patent
Pan (10) Patent No.: US 6,725,516 B2
(45) Date of Patent: Apr. 27, 2004

(54) RUBBER RING COUPLING APPARATUS (75) Inventor: Robert Pan, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 10/430,307

(22) Filed: May 7, 2003

(65) Prior Publication Data

US 2004/0031138 A1 Feb. 19, 2004

(30) Foreign Application Priority Data

Aug. 15, 2002 (TW) ........................................ 91212675 U (51) Int. Cl.$^7$ ................................................ B23P 19/04
(52) U.S. Cl. .............................. 29/235; 29/809; 29/229; 29/243.56
(58) Field of Search ........................... 29/235, 282, 229, 29/243.5, 243.52, 243.56, 450, 451, 453, 717, 809

(56) References Cited

U.S. PATENT DOCUMENTS

| | | | | |
|---|---|---|---|---|
| 3,808,664 A | * | 5/1974 | Jaquette | 29/235 |
| 4,177,546 A | * | 12/1979 | Geisinger | 29/235 |
| 4,183,132 A | * | 1/1980 | Nagashima et al. | 29/451 |
| 4,703,548 A | * | 11/1987 | Kumeth | 29/235 |
| 6,640,405 B2 | * | 11/2003 | Ino | 29/229 |

* cited by examiner

Primary Examiner—Joseph J. Hail, III
Assistant Examiner—Daniel Shanley
(74) Attorney, Agent, or Firm—Birch, Stewart, Kolasch & Birch, LLP (57) ABSTRACT

A rubber ring coupling apparatus for coupling rubber rings with an object includes a ring cartridge and expansion elements. A rubber ring is held in an expansion opening located in the ring cartridge. The expansion elements are disposed into the rubber ring and expanded along expansion slots formed in the ring cartridge. Then the object is inserted into the rubber ring and the expansion elements are withdrawn from the rubber ring to let the rubber ring couple with the object. Thereby assembly labor cost and time may be reduced.

5 Claims, 8 Drawing Sheets

RUBBER RING COUPLING APPARATUS

This nonprovisional application claims priority under 35 U.S.C. §119(a) on Patent Application No(s). 91212675 filed in TAIWAN on Aug. 15, 2002, which is(are) herein incorporated by reference.

FIELD OF THE INVENTION

The invention relates to a rubber ring coupling apparatus for objects that require coupled rubber rings, such as paper feeding rollers and shock absorption devices.

BACKGROUND OF THE INVENTION

In paper feeding mechanisms, a rod coupled with rubber rings is often used to convey paper and turn pages. Objects coupled with rubber rings are also widely used in shock absorption systems to reduce impact. Moreover, rollers coupled with rubber rings generally have greater durability. Because the rubber rings are useful in many applications, coupling rubber rings on objects also becomes an important process in many devices.

At present, coupling rubber rings on an object is mostly a manual process. Hand tools have to be used to expand the diameter of the rubber ring in order to couple the expanded rubber ring with the required object.

The manual process for coupling rubber rings is tedious and time-consuming. It is also difficult to install the rubber rings precisely on the required location of an object. Therefore to design a rubber ring coupling apparatus to save manpower and process time is an important issue yet to be resolved.

SUMMARY OF THE INVENTION

The primary object the invention is to provide a rubber ring coupling apparatus that has a mechanism to couple rubber rings to a required object to save manpower and process time.

Another object of the invention is to couple rubber rings on desired positions of a required object.

The rubber ring coupling apparatus of the invention aims at coupling rubber rings to an object. The apparatus includes a sliding platform and an expansion mechanism. The sliding platform includes ring cartridges and a track. The ring cartridges are mounted onto the platform. Each ring cartridge has expansion slots and an expansion opening. The expansion slots communicate with the expansion opening and are located in different directions around the expansion opening. A rubber ring may be held in the expansion opening. The expansion mechanism is movable on the sliding platform along the track, and includes at least two movable expansion elements.

When in use, the rubber ring is disposed in the expansion opening. The expansion mechanism is moved relative to the ring cartridge, and in the mean time the expansion elements are moved into the expansion opening that holds the rubber ring. Then the expansion elements may be moved in the expansion slots to expand the rubber ring, and the object to be coupled may be inserted into the expanded rubber ring. Thereafter, the expansion elements may be withdrawn and the rubber ring may couple with the object.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
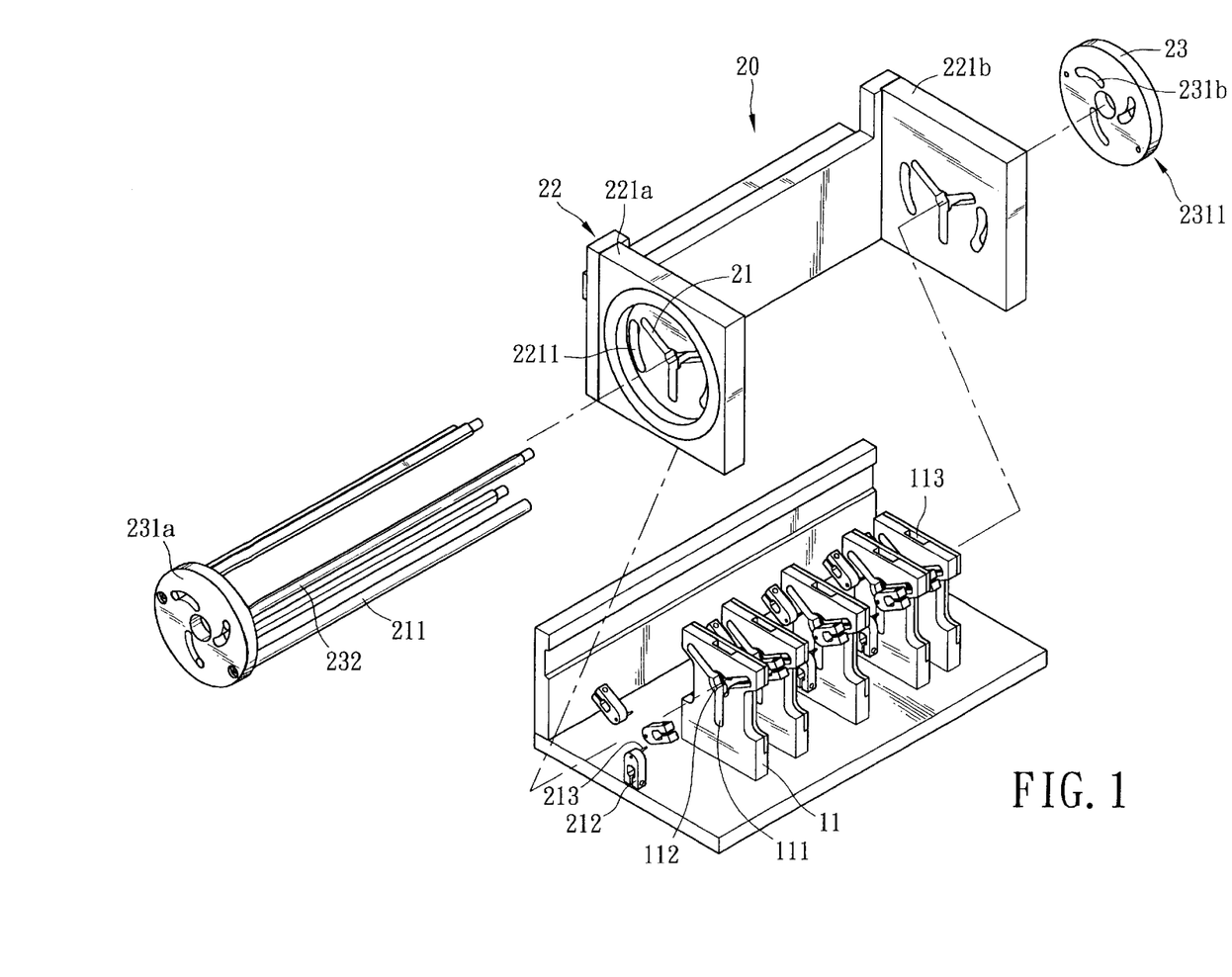
FIG. 1 is a fragmentary explored view of the invention.
Figure 2A:
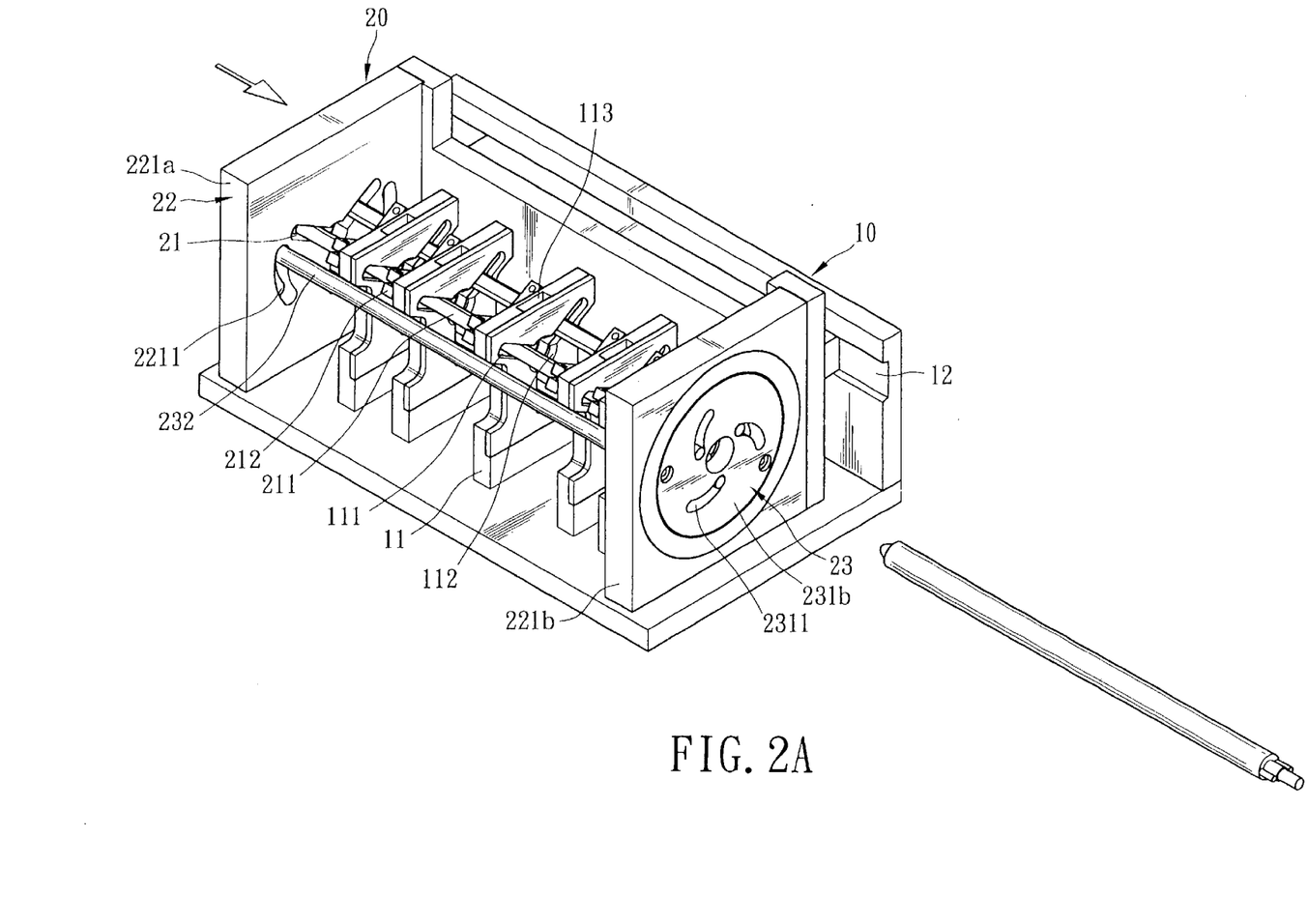
FIGS. 2A through 2G are schematic views of the invention in various operating conditions.
Figure 2B:
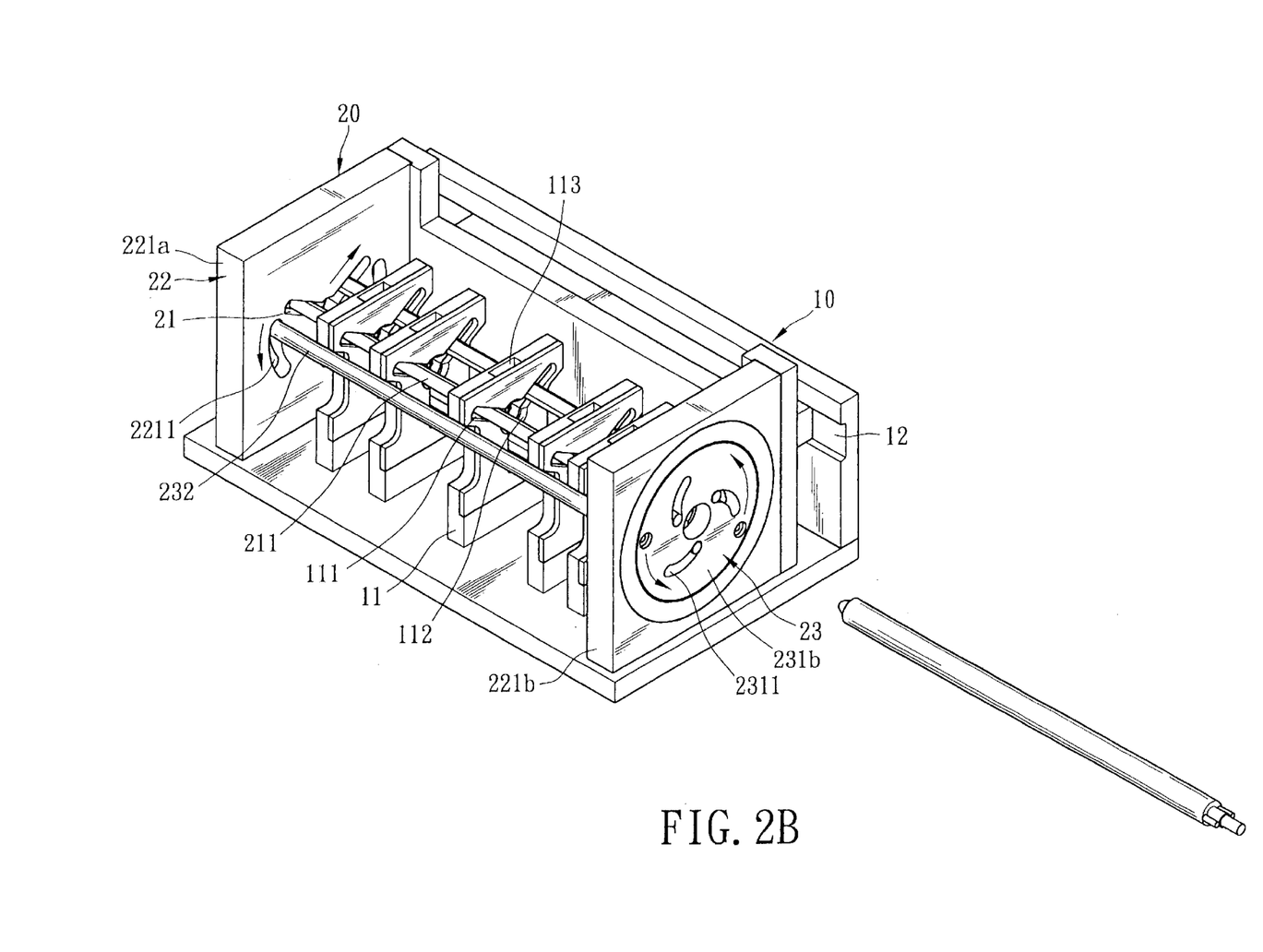
Figure 2C:
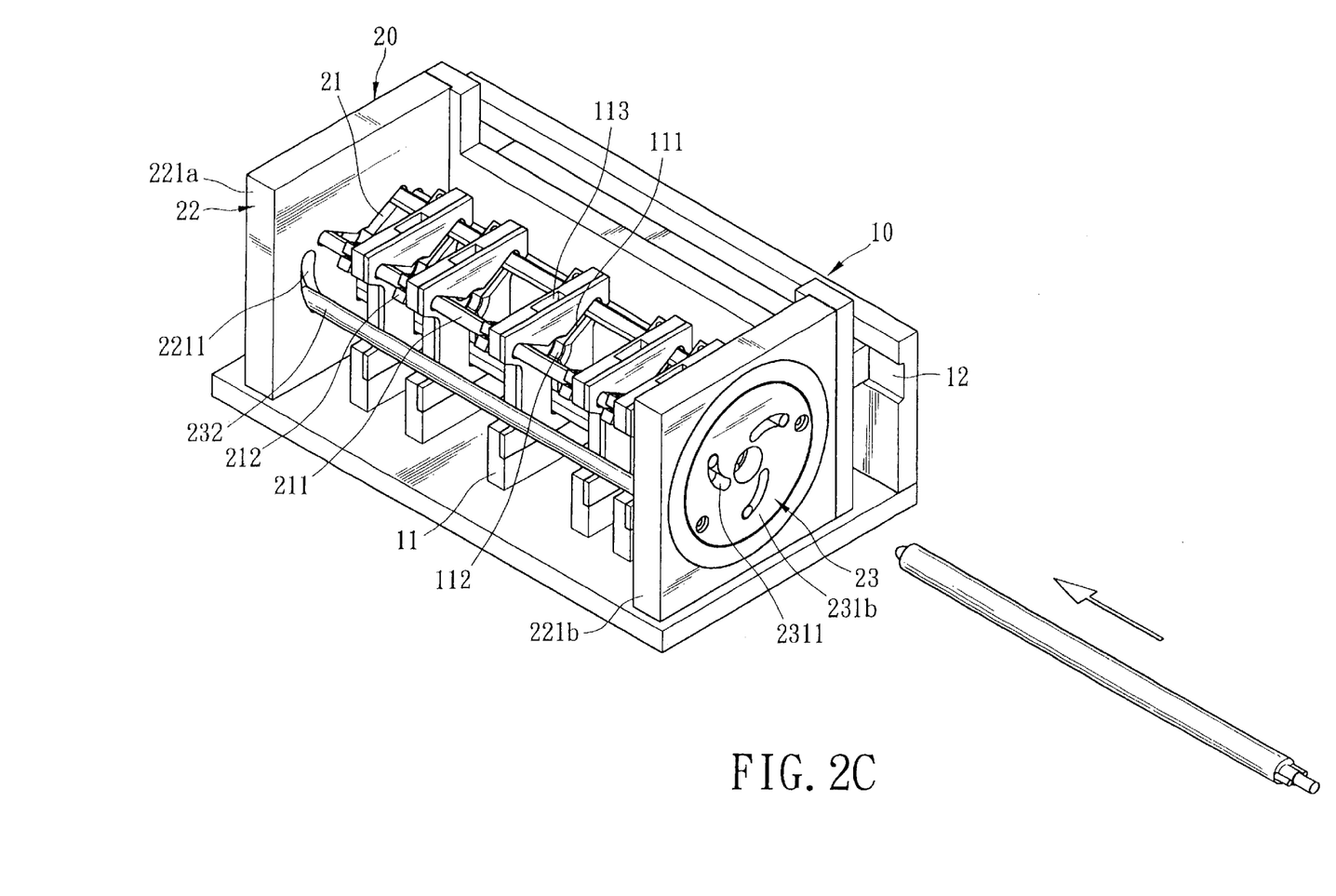
Figure 2D:
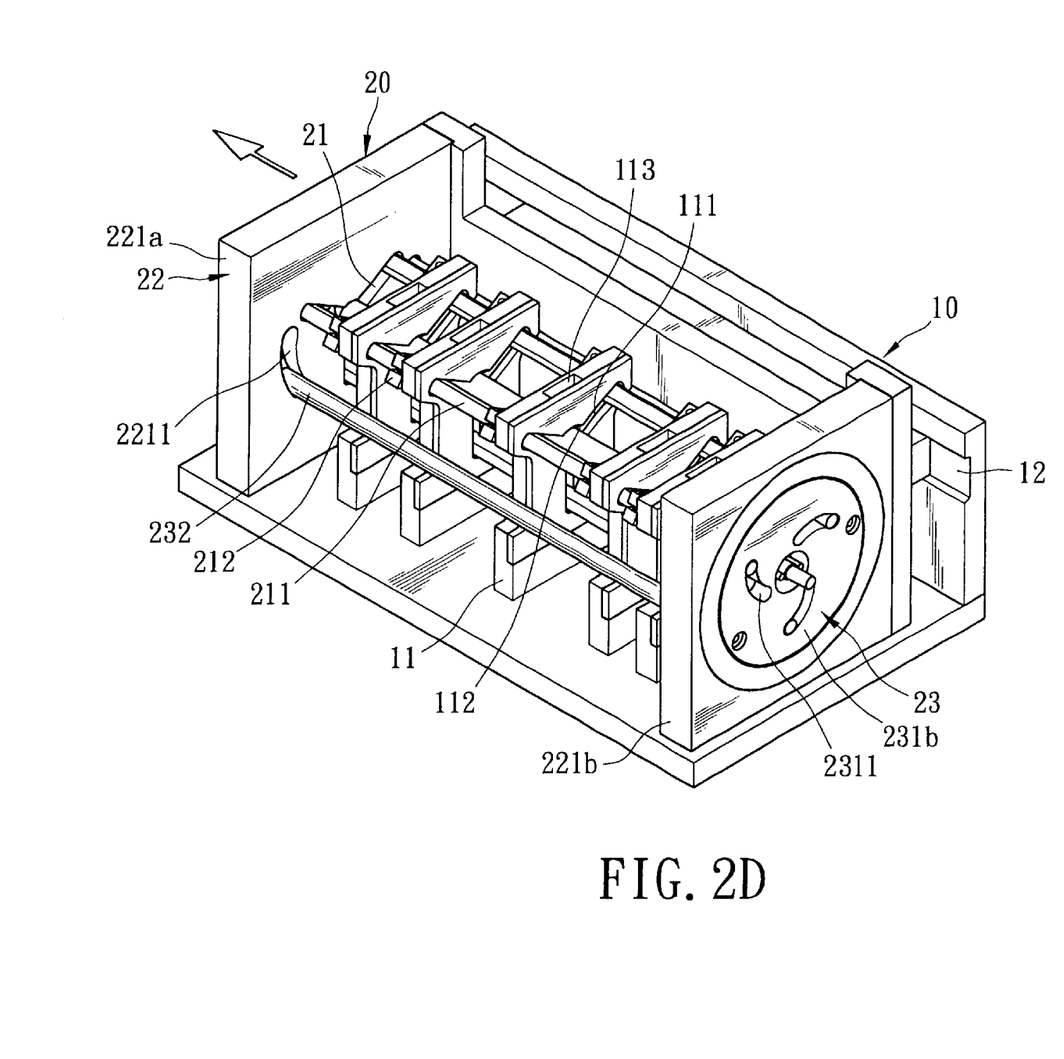
Figure 2E:
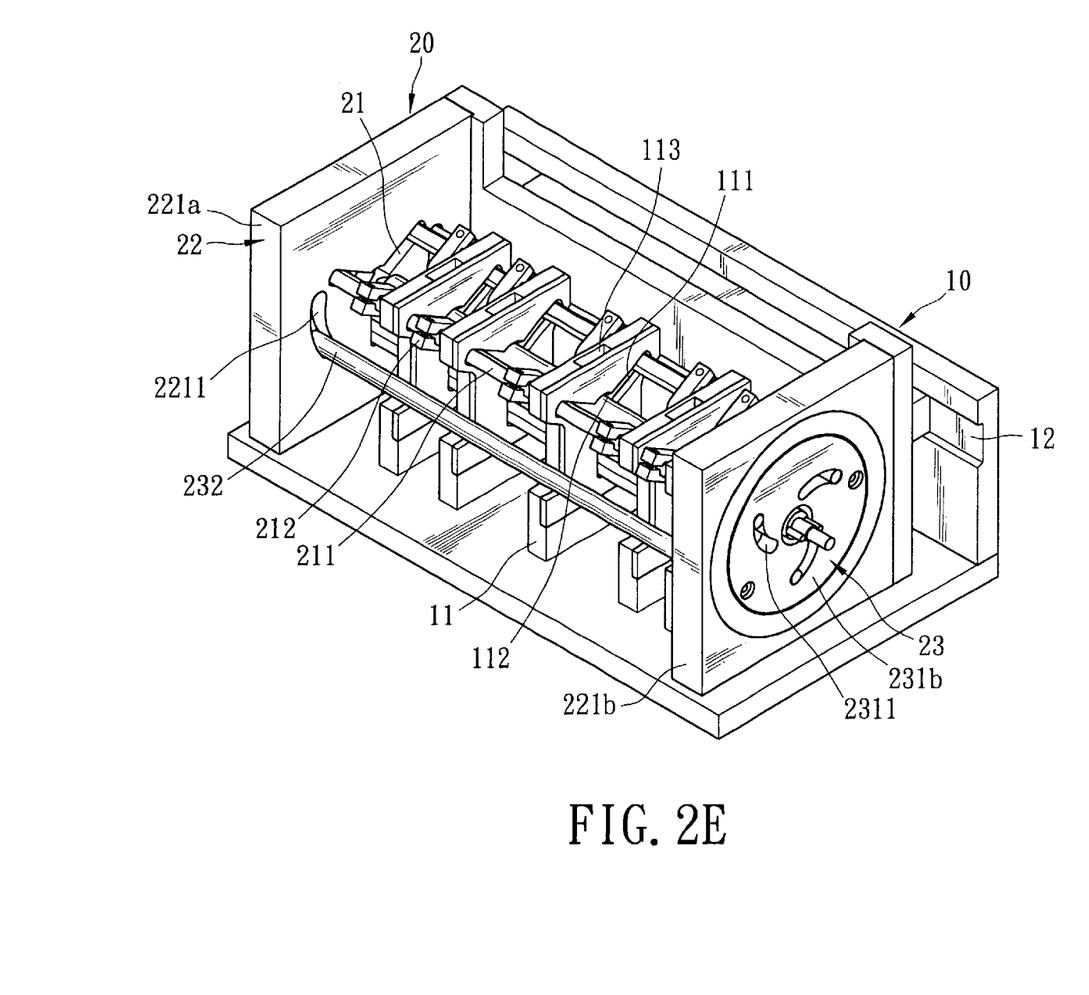
Figure 2F:
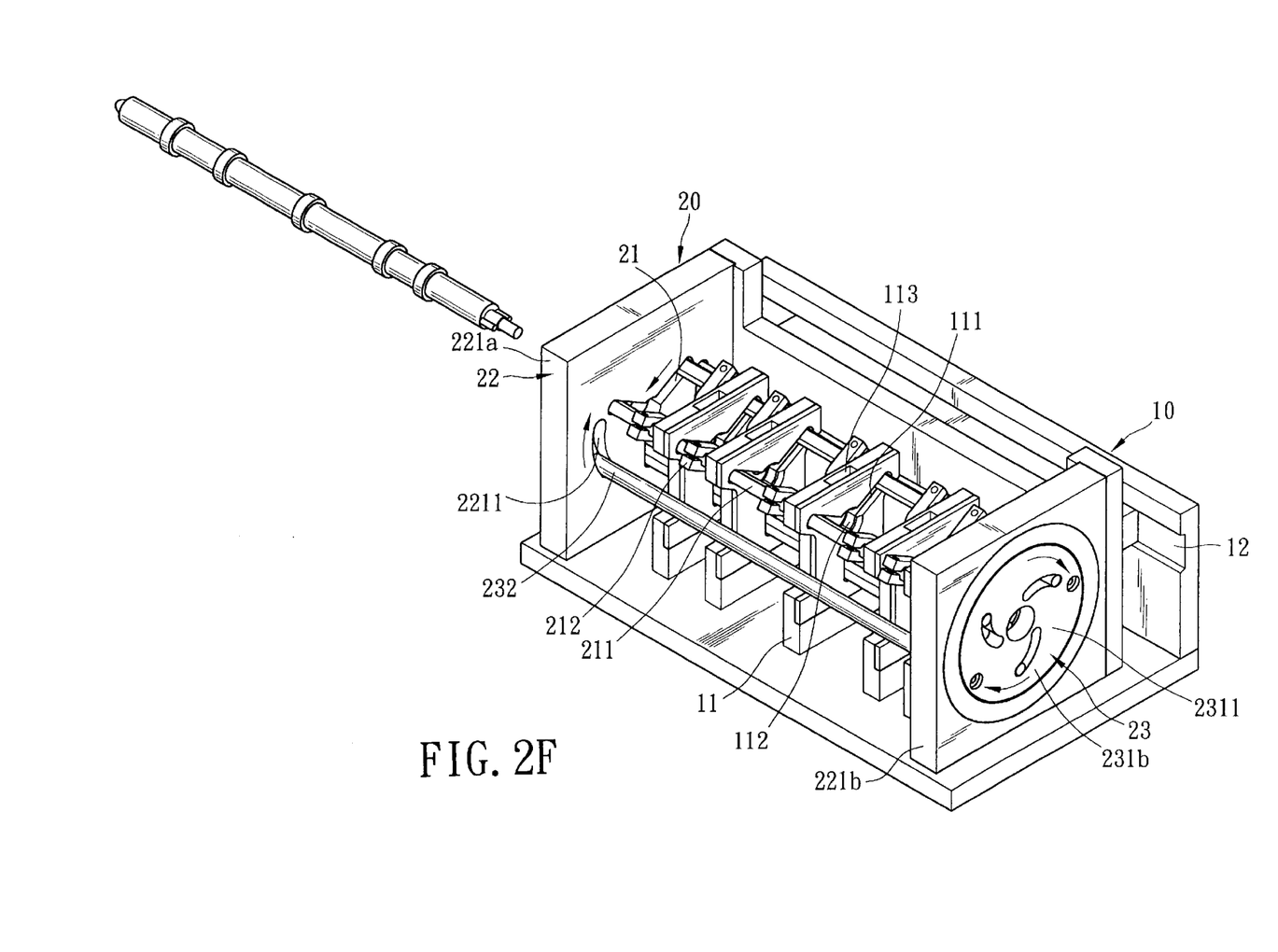
Figure 2G:
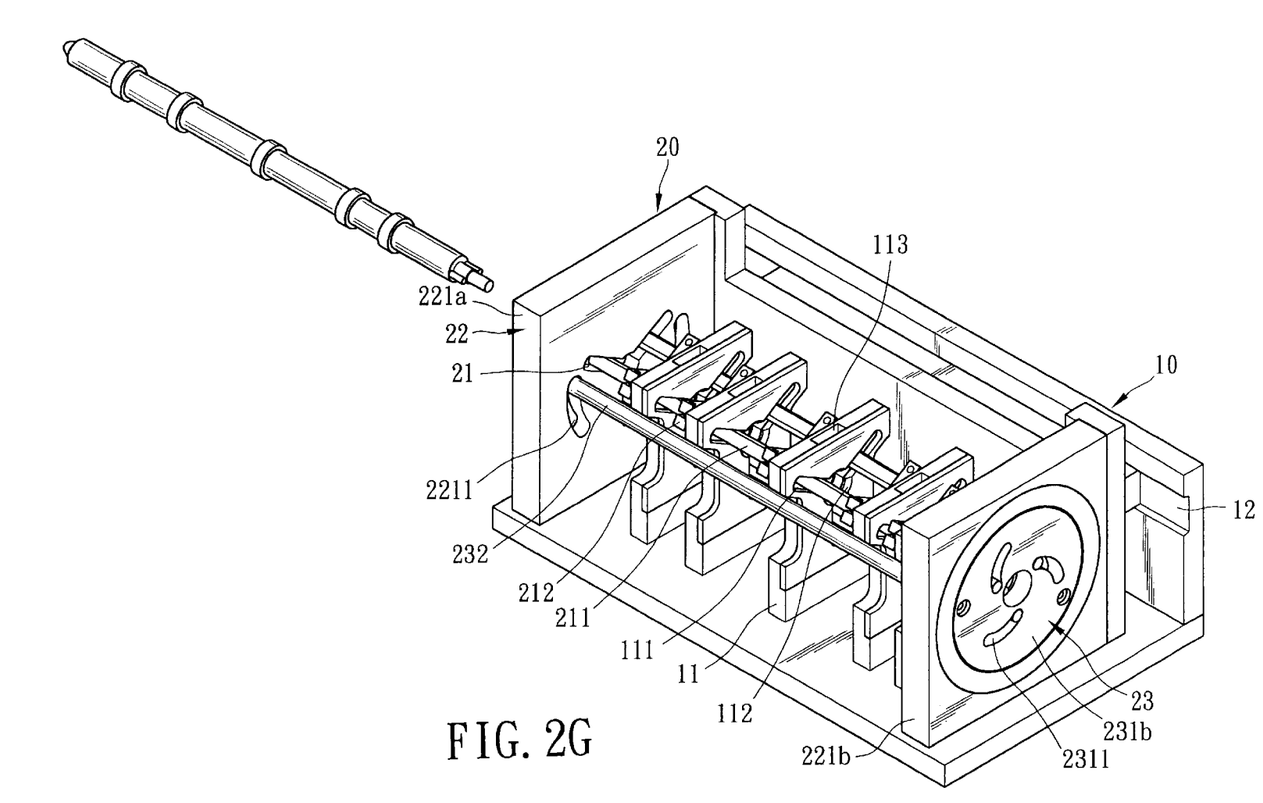

Referring to FIGS. 1 and 2A, the rubber ring coupling apparatus of the invention aims at coupling rubber rings with an object. The apparatus consists of a sliding platform 10 and an expansion mechanism 20.

The sliding platform 10 includes ring cartridges 11 and a track 12. The ring cartridges 11 are mounted onto the sliding platform 10. Each of the ring cartridges 11 has expansion slots 111, an expansion opening 112 and a ring inlet 113. The expansion slots 111 guide the movement of the expansion mechanism 20, communicate with the expansion opening 112, and are located in three different directions around the expansion opening 112. The expansion opening 112 holds a rubber ring and communicates with the ring inlet 113. The ring inlet 113 is located on the top end of the ring cartridge 11 for receiving the rubber ring. The rubber ring drops downwards due to gravity from the ring inlet 113 into the expansion opening 112. The track 12 guides the movement of the expansion mechanism 20.

The expansion mechanism 20 is movably located on the sliding platform 10 through the track 12. The expansion mechanism 20 consists of an expansion claw means 21, a dock 22 and an expansion control assembly 23. The expansion claw means 21 is movably mounted onto the expansion mechanism 20 and includes sliding rods 211, expansion arms 212 and expansion elements 213. The sliding rods 211 correspond to the expansion slots 111 at the selected directions of the expansion opening 112, and may be moved along the expansion slots 111. The number of the expansion arms 212 matches the sliding rods 211. The expansion arms 212 are mounted respectively onto the sliding rods 211. Each of the expansion elements 213 is mounted onto one expansion arm 212, and has one end remote from the expansion arm 212 and adjacent to the ring cartridge 11. When the sliding rods 211 are moved along the expansion slots 111, the expansion arms 212 and the expansion elements 213 are moved simultaneously.

The dock 22 consists of guiding boards 221a and 221b that each have guiding slots 2211 corresponding to the sliding rods 211 and the expansion slots 111.

The expansion control assembly 23 consists of disks 231a and 231b, and connection bars 232 for connecting the disks 231a and 231b. Because of the connection bars 232, the disks 231a and 231b may be turned simultaneously in the guiding boards 221a and 221b. The disks 231a and 231b further have arched slots 2311 corresponding to the sliding rods 211, expansion slots 111 and guiding slots 2211. When the expansion control assembly 23 is turned against the dock 22, the sliding rods 211 are moved along a moving path jointly defined by the expansion slots 111, guiding slots 2211 and arched slots 2311, and the expansion elements 213 are moved along the expansion slots 111.

Refer to FIGS. 2A through 2G for the invention in use for coupling a rubber ring on an object. First, the rubber ring is fed from the ring inlet 113 and drops into the expansion opening 112 due to gravity.

Then the expansion mechanism 20 is moved on the sliding platform 10 along the track 12, and the expansion elements 213 are moved into the rubber ring held in the expansion opening 112.

Next, the expansion control assembly 23 is moved to enable the sliding rods 211 of the expansion claw means 21 to move outwards along the arched slots 2311. While the sliding rods 211 are moving, as the expansion slots 111 correspond to the guiding slots 2211, each of the sliding rods 211 is also moved along one expansion slot 111 and one guiding slot 2211 (i.e. the sliding rod 211 is moved along a path jointly defined by the expansion slot 111, guiding slot 2211 and arched slot 2311). Thus the rubber ring is expanded by the expansion elements 213.

Then, the object is moved into the apparatus of the invention and inserted into the rubber ring held in the expansion opening 112 at a position where the rubber ring is to be coupled.

Thereafter, the expansion mechanism 20 is moved on the sliding platform 10 along the track 12 to its original position to withdraw the expansion elements 213 from the rubber ring. The rubber ring is left to couple with the object.

The object that couples with the rubber ring is moved from the apparatus of the invention.

Finally, the expansion control assembly 23 is moved to enable the sliding rods 211 of the expansion claw means 21 to move along the arched slots 2311 to their original positions. While the sliding rods 211 are moving, as the expansion slots 111 correspond to the guiding slots 2211, the sliding rods 211 are also moved along the expansion slots 111 and the guiding slots 2211 (i.e. each sliding rod 211 is moved along the path jointly defined by the expansion slot 111, guiding slot 2211 and arched slot 2311). Then coupling of the next rubber ring may be processed.

In the drawings provided four ring cartridges 11 are shown. However, only one ring cartridge 11 is required when the object is to couple with one rubber ring. The number of ring cartridges 11 depends on the user's requirements.

Similarly, although the expansion slots 111 are located in three directions of the expansion opening 112 in the drawings, they also may be located in two directions of the expansion opening 112 as long as the rubber ring can be expanded. Of course, the expansion opening 112 may also be designed with a holding clip located on one side thereof for holding the rubber ring and with the expansion elements 213 located on the other side for expanding the rubber ring.

In addition, the disks 231a and 231b of the expansion control assembly 23, instead of being held on the outer side of the guiding boards 221a and 221b, may also be held on the inner side of the guiding boards 221a and 221b as long as they can move the sliding rods 211.

By means of the construction set forth above, the apparatus of the invention can couple rubber rings to an object without conventional manual operations. Process time and labor cost can be reduced. Moreover, by means of the invention, the rubber rings can be coupled easily to the desired positions of the object.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A rubber ring coupling apparatus for coupling rubber rings to an object, comprising:

a sliding platform including a ring cartridge and a track, the ring cartridge mounted onto the sliding platform and having expansion slots and an expansion opening for holding a rubber ring, the expansion slots communicating with the expansion opening and located in different directions around the expansion opening; and an expansion mechanism movably located on the sliding platform through the track having a plurality of expansion elements, while the expansion mechanism moved relative to the ring cartridge, the expansion elements moved into the rubber ring located in the expansion opening, then the expansion elements moved along the expansion slots to expand the rubber ring, and the object moved into the expanded rubber ring, and thereafter the expansion elements withdrew from the rubber ring and the rubber ring coupling with the object.

2. The rubber ring coupling apparatus of claim 1, wherein the ring cartridge further has a ring inlet communicating with the expansion opening for receiving the rubber ring into the expansion opening.

3. The rubber ring coupling apparatus of claim 2, wherein the ring inlet is located on a top end of the ring cartridge to allow the rubber ring to drop into the expansion opening by gravity.

4. The rubber ring coupling apparatus of claim 1, wherein the expansion mechanism further includes an expansion claw means which consists of a plurality of sliding rods and a plurality of expansion arms corresponding to the expansion elements, the sliding rods corresponding to the expansion slots, the expansion arms mounted respectively onto the sliding rods, the expansion elements mounted respectively onto the expansion arms and having one end remote from the expansion arms and adjacent to the ring cartridge.

5. The rubber ring coupling apparatus of claim 4, wherein the expansion mechanism further includes:

a dock which consists of two guiding boards that have respectively a plurality of guiding slots corresponding to the sliding rods and the expansion slots; and an expansion control assembly which consists of two disks and a plurality of connection bars for connecting the two disks, the disks located in the docks and turnable and having a plurality of arched slots corresponding to the sliding rods, the expansion slots and the guiding slots such that when the expansion control assembly turned relative to the dock, the sliding rods moved along a path jointly defined by the expansion slots, the guiding slots and the arched slots for the expansion elements to move along the expansion slots.

* * * * *